US009204664B2

(12) United States Patent
Hortelius

(10) Patent No.: US 9,204,664 B2
(45) Date of Patent: Dec. 8, 2015

(54) UNIQUE SAUSAGE SHAPES AND DEVICES AND METHODS FOR PROCESSING SAUSAGES

(71) Applicant: Edward W. Hortelius, St. Paul, MN (US)

(72) Inventor: Edward W. Hortelius, St. Paul, MN (US)

(*) Notice: Subject to any disclaimer, the term of this patent is extended or adjusted under 35 U.S.C. 154(b) by 0 days.

(21) Appl. No.: 14/031,606

(22) Filed: Sep. 19, 2013

(65) Prior Publication Data

US 2014/0272092 A1 Sep. 18, 2014

Related U.S. Application Data

(62) Division of application No. 13/801,269, filed on Mar. 13, 2013, now Pat. No. 8,584,565.

(51) Int. Cl.
*A23L 1/317* (2006.01)
*A22C 11/00* (2006.01)
*A22C 17/00* (2006.01)

(52) U.S. Cl.
CPC ............. *A23L 1/3175* (2013.01); *A22C 11/00* (2013.01); *A22C 17/0006* (2013.01); *Y10T 83/0333* (2015.04); *Y10T 83/0341* (2015.04); *Y10T 83/0356* (2015.04); *Y10T 83/0363* (2015.04); *Y10T 83/8821* (2015.04)

(58) Field of Classification Search
CPC ..... A23L 1/317; A23L 1/0073; A23L 1/3175; B26D 3/28; B26D 2210/02; B26D 3/30; B26D 7/0683; A22C 17/002; A22C 17/0033; A22C 11/00
USPC ............ 426/105, 518, 143, 144; 30/90.4, 173
See application file for complete search history.

(56) References Cited

U.S. PATENT DOCUMENTS

| | | | |
|---|---|---|---|
| 881,841 A | 3/1908 | Bahnm | |
| 2,285,567 A | 6/1942 | Carroll | |
| 2,415,114 A | 2/1947 | Edwin | |
| 2,520,000 A | 8/1950 | Dettman | |
| 2,621,659 A | 12/1952 | Greene | |
| 2,636,267 A | 4/1953 | Whitcomb | |
| 2,675,580 A | 4/1954 | Augustine | |
| 2,776,480 A | 1/1957 | Abel | |
| 3,465,802 A | 9/1969 | Alea | |
| 3,816,919 A | 6/1974 | Portnoy | |
| 3,999,293 A | 12/1976 | Zubrycki | |
| 4,001,934 A | 1/1977 | Bell | |
| 5,069,914 A * | 12/1991 | Gagliardi, Jr. | 426/76 |
| 5,771,771 A | 6/1998 | Gagliardi | |

(Continued)

FOREIGN PATENT DOCUMENTS

EP 0384466 8/1990

OTHER PUBLICATIONS

Goldwyn, Hot dog heaven: How to cook frankfurters (http://amazingribs.com/recipes/hot_dogs_and_sausages/cooking_hot_dogs.html). 2009.*
Sawhney, Extreme Makeover, Weiner Edition: RKS Resigns the Deadly Hot Dog (http://www.fastcompany.com/1564477/extreme-makeover-weiner-edition-rks-redesigns-deadly-hot-dog) 2010.*

(Continued)

*Primary Examiner* — Rena L Dye
*Assistant Examiner* — Lela S Williams
(74) *Attorney, Agent, or Firm* — Fish & Richardson P.C.

(57) ABSTRACT

This document provides devices and methods for processing elongate generally cylindrical food products. For example, this document provides devices and methods for longitudinally cutting sausages, and the sausage designs as cut thereby.

13 Claims, 6 Drawing Sheets

(56) References Cited

U.S. PATENT DOCUMENTS

| | | | |
|---|---|---|---|
| 5,976,585 A | 11/1999 | Gagliardi | |
| 7,065,880 B2 | 6/2006 | Howman et al. | |
| 2003/0079350 A1 | 5/2003 | Howman et al. | |
| 2004/0224056 A1* | 11/2004 | Jordan | 426/105 |
| 2010/0255160 A1 | 10/2010 | Cagle | |

OTHER PUBLICATIONS

Strauss, Beef-Bacon Wrapped ,Stuffed Passover Sausage, Mar. 2012.*

Ahlgren, Black Iron Pan Split-Grilled Hot Dogs (http://bbqpitboys.com/recipes/split-grilled-hot-dogs#.U5duWPIdVZg). Aug 2012.

* cited by examiner

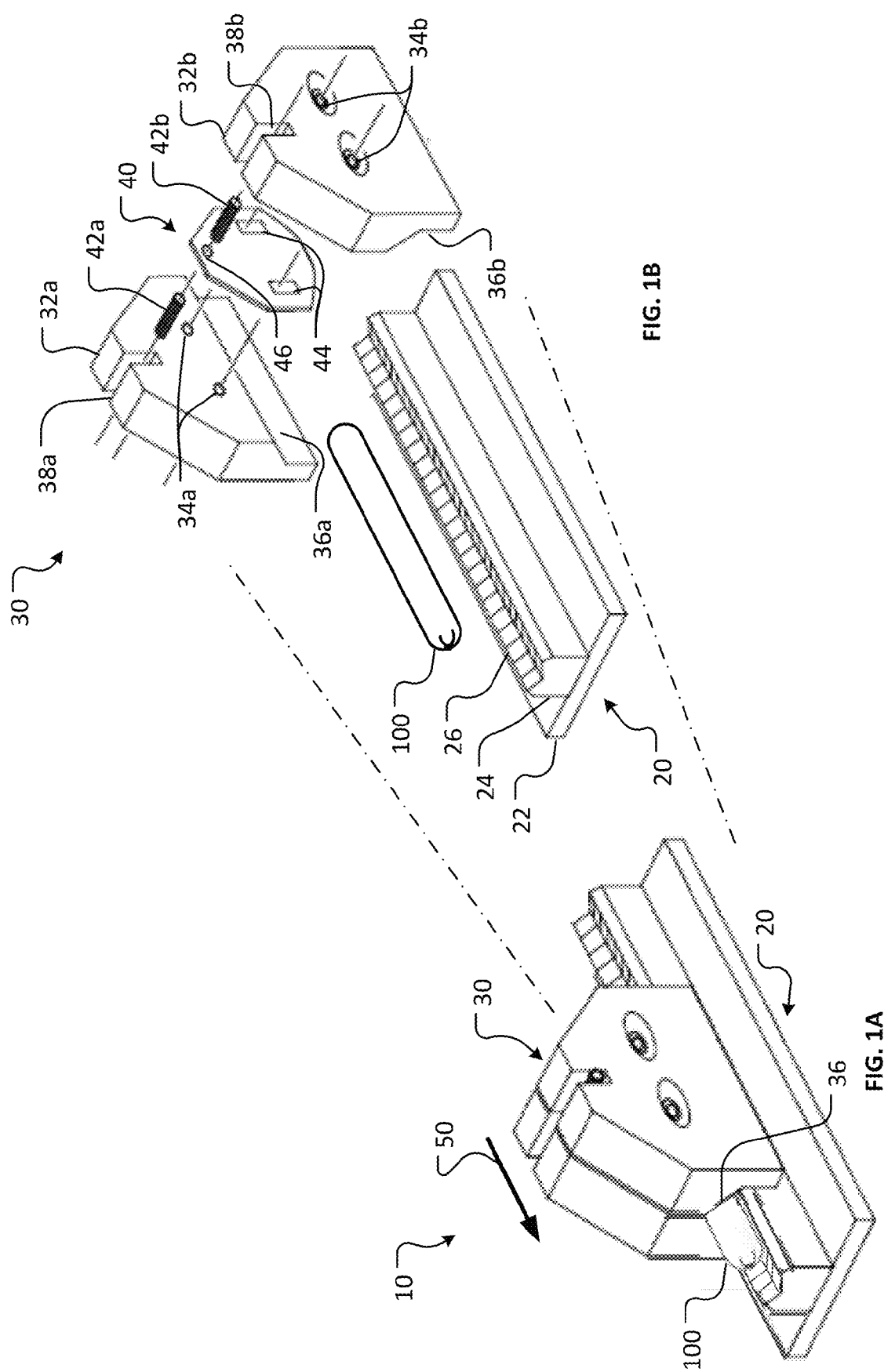

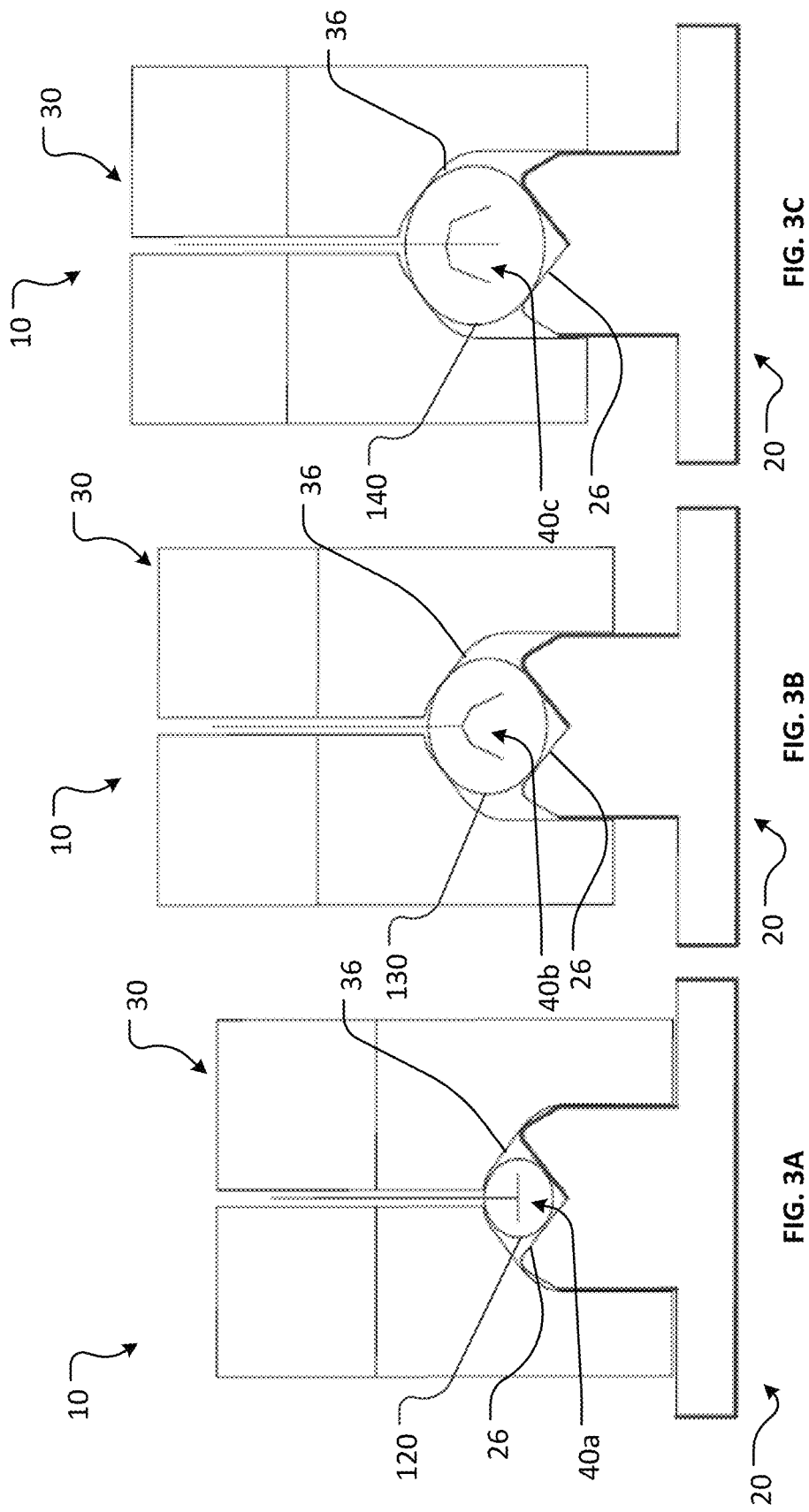

UNIQUE SAUSAGE SHAPES AND DEVICES AND METHODS FOR PROCESSING SAUSAGES

CLAIM OF PRIORITY

This application claims priority under 35 USC §119(e) to U.S. patent application Ser. No. 13/801,269, filed on Mar. 13, 2013, the entire contents of which are hereby incorporated by reference.

BACKGROUND

1. Technical Field

This document relates to devices and methods for processing elongate generally cylindrical food products. For example, this document relates to devices and methods for longitudinally cutting sausages, and to the sausages thereby cut.

2. Background Information

Whether they are known as sausages, hot dogs, frankfurters, franks, wieners, wienies, brats, red-hots, tube-steaks, links, or something else, the ubiquitous cylindrical meat product generally known as the sausage is beloved the world over. According to the National Hot Dog and Sausage Council, an estimated 20 billion hot dogs are consumed each year in the United States. That works out to about 60 hot dogs per person each year. On Independence Day alone, Americans will enjoy 150 million hot dogs—enough to stretch from Washington D.C. to Los Angeles over five times. Hot dogs are served in 95 percent of homes in the United States. About 15% of hot dogs are purchased from street vendors, and about 9% are purchased at ballparks.

SUMMARY

This document provides devices and methods for processing elongate generally cylindrical food products. For example, this document provides devices and methods for longitudinally cutting sausages, and the sausage designs as cut thereby.

In general, one aspect of this document features a cutlery apparatus comprising a base with a longitudinal axis. The base is adapted to support a sausage such that a major axis of the sausage is generally parallel with the longitudinal axis of the base. The cutlery apparatus also comprises a blade holder that is slidably engageable with the base. The blade holder is slidable in a direction parallel with the longitudinal axis of the base. The cutlery apparatus also comprises a blade extending from the blade holder. The blade is releasably coupled to the blade holder, and the blade has two or more cutting edges that are nonlinear and nonparallel in relation to each other.

These and other embodiments may each optionally include one or more of the following features. For instance, the base may include a v-shaped surface for supporting the sausage. The v-shaped surface may be on an elevated track. The sides of the elevated track may be slidably engageable with the blade holder. The v-shaped surface may include features that increase a coefficient of friction of the v-shaped surface. The blade may be one of: an inverted T-shape, an inverted t-shape, an inverted Y-shape, or a three-pronged pitchfork shape. A distance that the blade extends from the blade holder may be adjustable. The blade may have three or more cutting edges that are nonlinear in relation to each other. The blade may have four or more cutting edges that are nonlinear in relation to each other.

In general, another aspect of this document features a method of producing a sausage with multiple cut-planes. The method comprises cutting the sausage in a direction generally parallel to a major axis of the sausage. The cutting defines two or more cut-planes in the sausage. The two or more cut-planes are dissimilar from each other. One and only one cut-plane intersects an outer generally cylindrical surface of the sausage.

These and other embodiments may each optionally include one or more of the following features. For instance, the method may further comprise packaging the sausage. The cutting may be performed using a cutlery apparatus comprising a base with a longitudinal axis. The base is adapted to support a sausage such that a major axis of the sausage is generally parallel with the longitudinal axis of the base. The cutlery apparatus also comprises a blade holder that is slidably engageable with the base. The blade holder is slidable in a direction parallel with and in relation to the longitudinal axis of the base. The cutlery apparatus also comprises a blade extending from the blade holder. The blade is releasably coupled to the blade holder, and the blade has two or more cutting edges that are nonlinear and nonparallel in relation to each other.

The at least one additional incision may comprise two or more additional incisions that are non-linear in relation to each other. The two or more cut-planes may comprise three or more cut-planes. The cutting may be performed in a single generally linear motion.

In general, another aspect of this document features an elongate generally cylindrical food product comprising a sausage comprising an outer generally cylindrical surface and an edible substance within the outer generally cylindrical surface. The sausage defines a major axis. The sausage includes two or more planes of discontinuity that are both generally parallel to the major axis and distinct from each other. The two or more planes of discontinuity define two-dimensional planes at which a discontinuity of the sausage's edible substance exists, wherein one and only one of the planes of discontinuity intersects the outer generally cylindrical surface.

These and other embodiments may each optionally include one or more of the following features. For instance, the two or more planes of discontinuity may comprise three or more planes of discontinuity that are distinct from each other. The two or more planes of discontinuity may comprise four or more planes of discontinuity that are distinct from each other.

Particular embodiments of the subject matter described in this document can be implemented to realize one or more of the following advantages. Using the devices and methods provided herein, sausages can be safely cut in a longitudinal direction. Satisfactory longitudinal cuts in sausages can be consistently attained using the devices and methods provided herein. Multiple longitudinal cuts can be made to sausages in a single step. Sausages with longitudinal cuts can have the following advantages. Sausages can be made healthier because more than normal amounts of fat and sodium can be removed during the cooking process. Cooking times can be decreased. Sausages can be cooked more evenly. For example, in some cases sausages can be cooked "well-done" throughout without burning the outside of the sausage. A greater area of a sausage can be directly exposed to a grill's direct heat, leading to more browning and more smoky-flavor. The sausages with longitudinal cuts can be well-suited to holding a substantial amount of condiments. For example, sausages that have been cut using the devices and methods provided herein are well-suited for use in Chicago-style hot dogs, chili dogs, and coney dogs. In some cases, due to the non-cylindrical shape of the sausages with longitudinal cuts, some choking risks attributable to cylindrical food shapes may be mitigated.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 1A is an illustration of an example apparatus for longitudinally cutting a sausage in accordance with some embodiments provided herein.

FIG. 1B is an exploded view of the apparatus of FIG. 1A.

FIGS. 3A-3C are end views of a variety of differently sized sausages being longitudinally cut by a variety of example blade configurations in accordance with some embodiments provided herein.

Like reference numbers represent corresponding parts throughout.

DETAILED DESCRIPTION

Figure 2A:
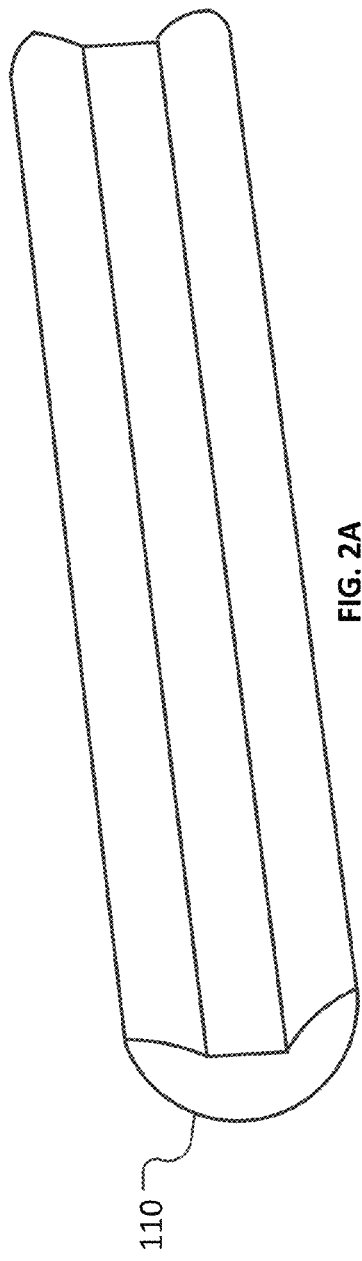
FIG. 2A illustrates an example of a cooked sausage after cutting using an apparatus for longitudinally cutting a sausage in accordance with some embodiments provided herein.

This document provides devices and methods for processing elongate generally cylindrical food products. For example, this document provides devices and methods for longitudinally cutting sausages, and the sausage designs as cut thereby. As used herein, the term "sausage" broadly refers to all types of generally sausage-like food products, regardless of the name. Further, the term "sausage" herein refers to all variations of sausage-like food products, including but not limited to: skinned or skinless; cooked or uncooked; large diameter or small diameter; long or short; made of meat, meat-substitutes, or a combination thereof; and including any and all other variations and types of sausages. The devices and methods provided herein are applicable to all types and variations of generally cylindrical sausages.

In one example embodiment, a meat cutlery device provided herein generally includes a stationary base and a movable blade holder. The movable blade holder can be configured to engage with the stationary base in a complimentary fashion. In some embodiments, the movable blade holder includes a recess that can straddle the stationary base with a sliding fit. In some embodiments, the movable blade holder can be configured to slide on the stationary base to pass a knife blade through a sausage in an axial (longitudinal) direction in relation to the sausage.

In some embodiments, the stationary base can be configured to receive one or more sausages, and to hold them during the cutting process. In some embodiments, the stationary base includes an elongate v-shaped cradle in which sausages are temporarily positioned for the cutting process. In some embodiments, the elongate v-shaped cradle includes a surface with features intended to increase the coefficient of friction of the surface. With such a frictional surface, the stationary base can be well-suited for retaining the sausage in a substantially stationary position during the cutting process. The v-shaped cradle is also compatible for receiving sausages of a variety of lengths and diameters.

The movable blade holder can be a generally block-like object containing one or more cutting blades. The shape of the movable blade holder can be contoured to facilitate convenient holding and manipulation by a user's hand. The movable blade holder contains cutting blades that can have a variety of configurations. In general, the configurations of the cutting blades provided herein induce multiple cut-planes in a single sausage. That is, the blades have two or more cutting edges that are non-linear in relation to each other. However, a single cutting edge penetrates the outer generally cylindrical periphery of the sausage. As described further below, the cutting blades provided herein may be an inverted t-shape, inverted T-shape, inverted Y-shape, pitch fork-shaped, and so on.

The sausages that have been processed using the devices and methods provided herein are split open longitudinally. The cutting blades provided herein induce multiple cut-planes such that the processed sausages can have cross-sectional shapes such as u-shaped, w-shaped, and so on.

With reference to FIGS. 1A and 1B, a sausage-cutting device 10 for longitudinally cutting sausages 100 is provided. In general, the device 10 includes a stationary base 20, a movable blade holder 30, and a blade 40. FIG. 1A depicts the sausage-cutting device 10 in the process of longitudinally cutting sausage 100. That is, the movable blade holder 30 is depicted in movement in relation to the stationary base 20 as indicated by arrow 50. FIG. 1B is an exploded view of the sausage-cutting device 10 of FIG. 1A.

The stationary base 20 includes a base plate 22 and an elevated track 24. The base plate 22 and elevated track 24 can be made as a common part from a single piece of material, or made as separate pieces that are later joined together. In some embodiments, the base plate 22 and elevated track 24 are made to stay joined together. In some embodiments, the base plate 22 and elevated track 24 are made to be separable, for example, for cleaning purposes.

In some embodiments, the base plate 22 and elevated track 24 are made from the same material. In some embodiments, the base plate 22 and elevated track 24 are dissimilar materials. The materials used for the base plate 22 and elevated track 24 can generally include any material suitable for food processing, including for example metallic, polymeric, and wood materials. Such materials can include, without limitation, stainless steels, alloy steels, aluminums and other metals; polypropylene, high-density polyethylene, polyvinyl chloride, ultra-high molecular weight polyethylene and other plastics; teak, bamboo, maple and other woods (including butcher-block construction); and granite, marble, other stones and stone-like synthetic materials. Some embodiments can include a combination of such materials.

In some embodiments, the base plate 22 has feet (not shown) that make contact with a surface on which the base plate 22 is setting. Typical surfaces may include a table or counter top. In some embodiments, the feet are made from compliant materials such as rubber or synthetic materials that can grip the surface on which the stationary base is setting. In some embodiments, the feet are suction cups. In some embodiments, no feet are included and the base plate 22 sets directly on the surface.

The length of the stationary base 20 can be made to suit the desires of the user. As shown, in some embodiments the length may be made to be suitable for cutting one sausage 100 at a time. In other embodiments, the stationary base 20 is made longer such that two or more sausages 100 can be placed in tandem longitudinally on the stationary base 20. In such embodiments, two or more sausages 100 can be cut with a single longitudinal swipe of the blade holder 30 as represented by arrow 50.

The elevated track 24 can be configured to receive and temporarily hold a sausage 100. In some embodiments, the elevated track 24 has a v-shaped surface 26 profile. Such a v-shaped profile can be advantageous in that it can accommodate a range of sausage diameters. Other suitable surface 26 profiles are also envisioned, e.g., semi-circular, flat, and concaved, to provide a few additional examples. In some embodiments, the width of the surface 26 is adjustable to accommodate sausages 100 that have different diameters.

In some embodiments, the surface 26 can be configured to increase its coefficient of friction. Such a surface can be well-suited to keeping the sausage 100 substantially stationary during the cutting process. In some embodiments, the surface 26 can have a plurality of transverse ridges that can grip the sausage 100 as depicted in FIGS. 1A and 1B. In some embodiments, the surface 26 can be adapted in other ways to have extra surface roughness. For example, surface 26 can be a sandblasted surface, a stippled surface, a knurled surface, and the like.

In some embodiments, the surface 26 of the elevated track 24 can include a vertical protrusion that acts as a stop device to prevent the sausage 100 from sliding off the surface 26 during the cutting process. In such embodiments, an end of the sausage 100 can abut the vertical protrusion, and the vertical protrusion can block the sausage 100 from being pushed off the surface 26 by the forces exerted on the sausage 100 during the cutting process.

The example movable blade holder 30 can include two halves 32a and 32b that can be similarly shaped, or dissimilarly shaped. In some embodiments, the blade 40 can be sandwiched between the two halves 32a and 32b. The movable blade holder 30 provides user safety protection from exposure to the blade 40 because the blade 40 is sandwiched between the two halves 32a and 32b. The movable blade holder 30 is slidably engageable with the stationary base 20. In some embodiments, the base 20 is movable and the blade holder 30 is held stationary.

The movable blade holder 30 can be constructed of the same types of materials as the stationary base 20. That is, the materials used to construct the movable blade holder 30 can include, without limitation, stainless steels, alloy steels, aluminums and other metals; polypropylene, high-density polyethylene, polyvinyl chloride, ultra-high molecular weight polyethylene (UHMW) and other plastics; teak, bamboo, maple and other woods (including butcher-block construction); and granite, marble, other stones and stone-like synthetic materials. Some embodiments can include a combination of such materials. In some embodiments the movable blade holder 30 and the stationary base 20 are made from the same kind of material. In some embodiments, the movable blade holder 30 and the stationary base are made from dissimilar materials.

In some embodiments, the two halves 32a and 32b can be coupled together using, for example, two screws. In some embodiments, a single screw is used. In some embodiments, no screws are used. That is, latches, hinges, detents, spring pins, dowels, and a variety of other types of fastening techniques can be used to couple the two halves 32a and 32b together. Ease of disassembly of the movable blade holder 30 is a convenience feature that can be advantageous for the cleaning of the movable blade holder 30.

The two halves 32a and 32b of the example movable blade holder 30 are assembled together using screws 34b. The screws 34b project from blade holder half 32b, through slots 44 in blade 40, and into threaded holes 34a in blade holder half 32a. The screws, being engaged in threaded holes 34a, can be tightened to hold the movable blade holder 30 together as a single assembly. In some embodiments, the threaded holes 34a are threaded inserts. In some embodiment, the material of the blade holder half 32a itself is threaded to form the threaded holes 34a. In some embodiments, the screws 34b are thumbscrews so that no tools are needed to tightened the movable blade holder 30 together.

The elongate slots 44 in the blade 40 allow the location of blade 40 in relation to the two halves 32a and 32b to be adjustable. That is, blade 40 has a vertical range of adjustment between a lower-most position and an upper-most position. Adjustment of the blade 40 between its lower-most and upper-most positions can result is adjusting the depth-of-cut of the sausage-cutting device 10.

A variety of materials can be used for the blade 40. In some embodiments, the materials to make blade 40 can include, without limitation, alloy steels, stainless steels, high-carbon steels and other metals; ceramics; or polymeric materials.

In some embodiments, the blade 40 includes handles 42a and 42b. The handles 42a and 42b can be attached to the blade 40 to provide a convenient grasping location for adjustment the depth-of-cut of the blade 40. For example, handles 42a and 42b can have internally threaded holes. A threaded stud (not shown) can be positioned through a hole 46 in the blade 40. The handles 42a and 42b can be engaged with the threaded stud and tightened so that the handles 42a and 42b rigidly project from opposite sides of the blade 40. In some embodiments, the periphery of the handles 42a and 42b can be knurled to facilitate gripping of the handles 42a and 42b. The two halves 32a and 32b can include clearance slots 38a and 38b. The handles 42a and 42b can project into and, in some embodiments, project through the clearance slots 38a and 38b. In some embodiments, depth adjustment markings are located near the clearance slots 38a and 38b to visually assist the user while making depth-of-cut adjustments for sausages 100 of various diameters.

In some embodiments, to change the depth-of-cut of the sausage-cutting device 10, the user can follow these steps. First the screws 34b can be loosened (but removal is not necessary). Next, the user can grip the handles 42a and 42b and manipulate the blade 40 up or down in relation to the two halves 32a and 32b. Then, while holding the handles 42a and 42b in the desired position, the screws 34b can be retightened to lock the blade 40 in place between the two halves 32a and 32b.

In some embodiments, each half 32a and 32b includes a track clearance region 36a and 36b. When the movable blade holder 30 is assembled, the clearance regions 36a and 36b combine to form an elongate channel 36 that is complimentarily shaped with the elevated track 24 of the stationary base 20. That is, as best seen in FIG. 1A, the elongate channel 36 is just slightly wider than the width of the elevated track 24, such that the movable blade holder 30 can be positioned to straddle the elevated track 24. The clearance regions 36a and 36b can slidably engage with the sides of the elevated track 24. With the sausage-cutting device 10 in this configuration, the movable blade holder 30 can be slid along the elevated track 24 (as represented by arrow 50) to cut a sausage 100 that is positioned on surface 26.

In some embodiments, the surfaces of the track clearance regions 36a and 36b can be adapted to reduce the friction between the surfaces 36a and 36b and the sausage 100. For example, in some embodiments a TEFLON® or similar non-stick coating can be included on the surfaces 36a and 36b. In some embodiments, an insert of UHMW or another low-friction material can comprise the surfaces of the track clearance regions 36a and 36b.

With reference to FIG. 2A, an example sausage 110 is depicted. The sausage 110 is an example of a sausage that has been cut longitudinally using the devices and methods provided herein. The sausage 110 in the form shown can be already cooked, or raw (ready for cooking). But in general, the sausage 110 will tend to open up as shown after cooking (refer to FIG. 2B). Prior to cooking the sausage 110 will tend to be more cylindrical than shown. In some cases, a pre-cooked sausage 110 that has been processed using the sausage-cutting device 10 provided herein will have the incision through the outer cylindrical surface visible as an indication that the sausage 110 has been so processed.

The sausage 110 may have been cut, for example, using a blade with an inverted T-shaped profile. In such cases, a first incision was made through the outer cylindrical surface of the sausage 110, and at least one additional incision was made within the sausage 110. The first incision and the at least one additional incision define cut-planes within the sausage 110 that are dissimilar in relation to each other. While the sausage 110 may appear to some observers like meat material has been removed from the sausage 110, in fact no substantial amount of meat has been removed. That appearance is related to the fact that the cutting of the sausage 110 using the devices and methods provided herein allows the opening of the sausage 110 such that it is no longer cylindrical.

The cut-profile of the sausage 110 facilitates a number of advantages. For example, fat and sodium in sausage 110 can be reduced by exposing additional meat surface area and allowing the fat and sodium to escape during cooking. The sausage 110 can conveniently hold a substantial amount condiments because of its boat-like shape. This makes sausage 110 well-suited to becoming a Chicago-style hot dog, or a chilidog, for example. The sausage 110 may, in some cases, reduce the risks of choking on the sausage 110 because it is non-cylindrically shaped after the cutting.

Figure 2B:
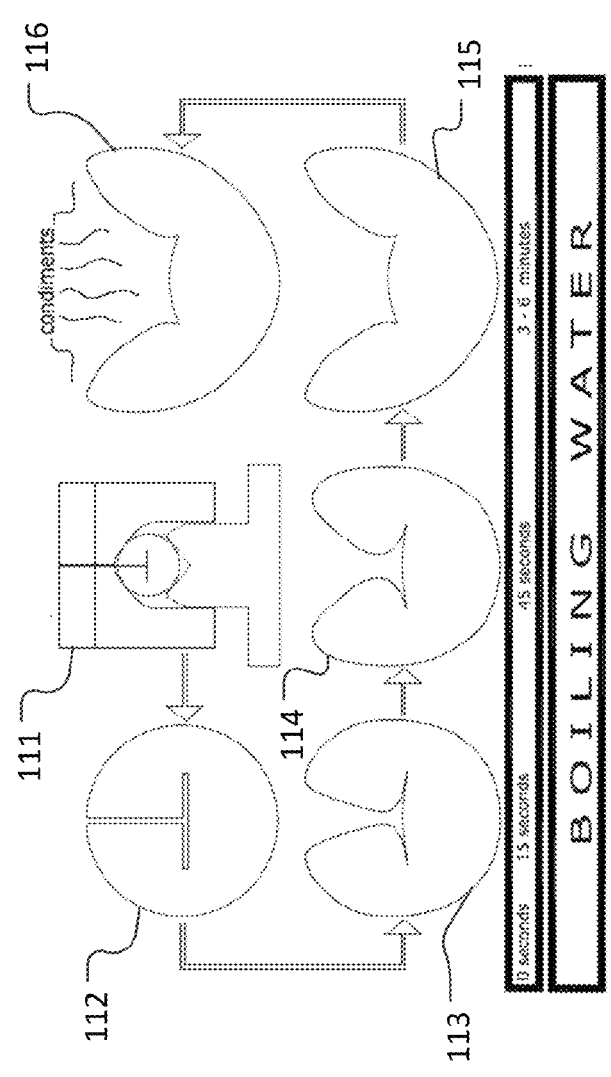
FIG. 2B illustrates a progression of sausage configurations starting from longitudinal cutting through cooking of the sausage.
Figure 4A:
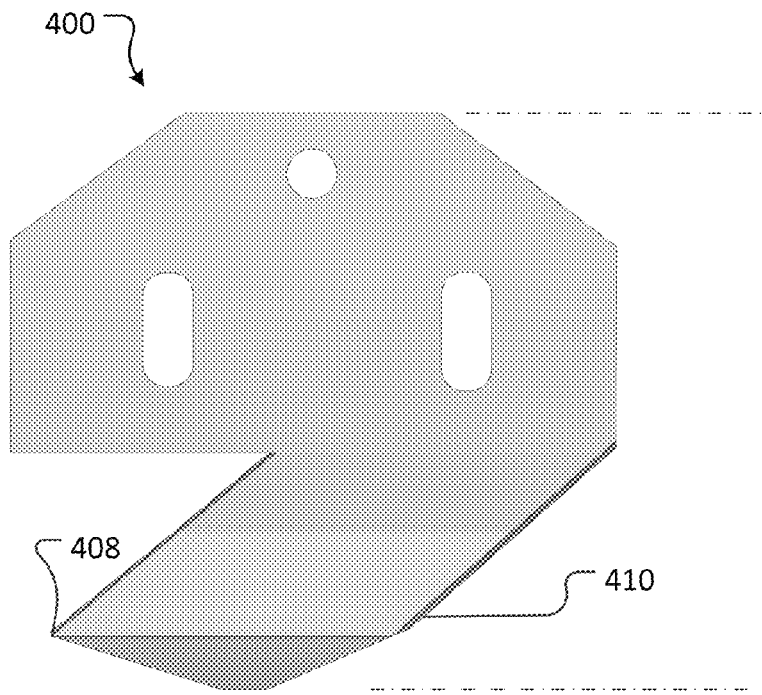
FIGS. 4A-4D are illustrations of example blade combinations in accordance with some embodiments provided herein.
Figure 4B:
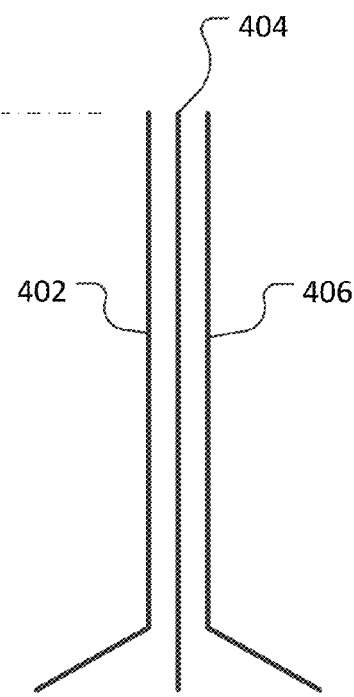
Figure 4C:
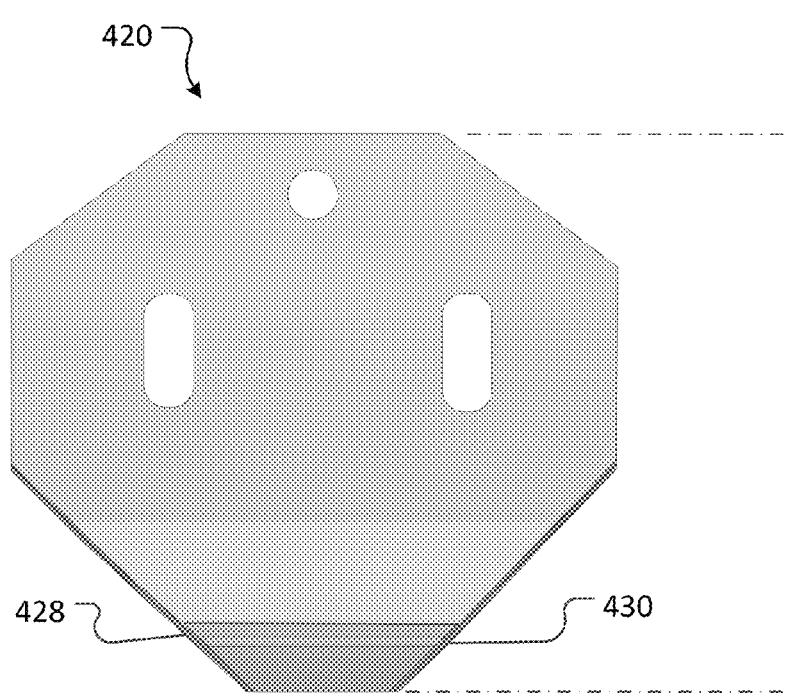
Figure 4D:
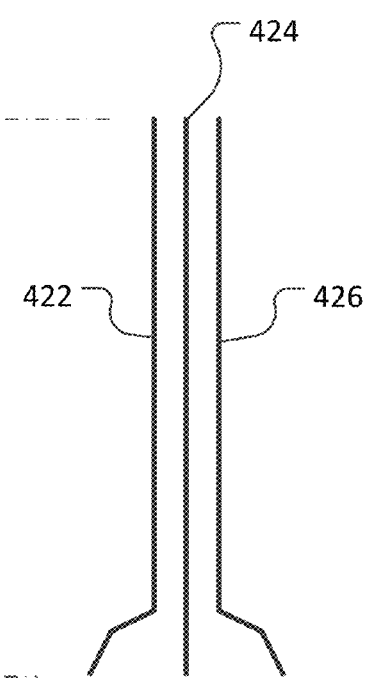

FIG. 2B illustrates a progression of sausage configurations starting from longitudinal cutting of a sausage through the cooking process of the sausage. In this example, cooking by boiling the sausage 110 is depicted, but other methods of cooking also provide a similar result. At 111, a sausage is depicted as being longitudinally cut by an inverted T-shaped blade using the devices and methods provided herein. At 112, the sausage is depicted after the longitudinal cutting and before cooking. At 113, the early cooking process has started to open up the longitudinally cut sausage. At 114, as the cooking process progresses the sausage opens up further. At 115, at or near the end of the cooking process, the sausage is substantially opened up. At 116, the use of the opened up sausage for holding a substantial amount condiments is illustrated.

With reference to FIGS. 3A-3C, end views of example sausage-cutting device 10 are shown cutting sausages 120, 130, and 140. These figures illustrate how the sausage-cutting device 10 can be used to longitudinally cut sausages 120, 130, and 140 that have varying diameters. That is, sausage 120 has a relatively small diameter, whereas sausage 130 is medium sized and sausage 140 has a large diameter.

The sausage-cutting device 10 is versatile in that it can accommodate sausages of varying diameters. The stationary base 20, with its v-shaped surface 26 can hold sausages of varying diameters. The elongate channel 36 of the movable blade holder 30 is wide enough to handle large sausage 140, while still functioning with smaller sausages 120 and 130. As shown, for larger sausages 130 and 140 the movable blade holder 30 operates at a higher elevation in relation to the stationary base 20 as compared to for smaller sausages 120. As shown in FIGS. 3B and 3C, in some cases the elongate channel 36 of the movable blade holder 30 slides on the outer cylindrical surface of the sausage 130 and 140.

For sausages of different diameters, it may be desirable to adjust the depth-of-cut of the blades 40a-c. For example, for large sausage 140, it may be desirable to lower the blade 40c in relation to the movable blade holder 30. Likewise, for smaller sausage 120, it may be desirable to raise the blade 40a in relation to the movable blade holder 30.

In some cases, it may be desirable to make multiple cut-passes through a single sausage. For example, a first-pass cut can be made at an upper depth-of-cut blade height setting. Then, the depth-of-cut of the blade can be adjusted—to a lower depth-of-cut blade height setting, for example. Then a second-pass cut could be made. This method can result in additional cut-planes within the sausage in comparison to a single-pass processing method.

These figures also show various example blade configurations 40a, 40b, and 40c. These examples illustrate three types of blade configurations that have multiple cutting edges. That is, rather than being a single blade member that induces a single cut-plane, the blades 40a, 40b, and 40c have multiple blade members that induce multiple corresponding cut-planes. Consequently, these types of blades are also known herein as "multi-blades." The blade 40a is an inverted T-shaped multi-blade. The blade 40b is an inverted Y-shaped multi-blade. The blade 40c is a three-pronged pitchfork-shaped multi-blade.

Multi-blades have two or more cutting edges that are non-linear in relation to each other. For example, blade 40a has two cutting edges that are nonlinear in relation to each other (a vertical cutting edge and a horizontal cutting edge). Blades 40b and 40c have five cutting edges that are non-linear in relation to each other.

Multi-blades produce sausages that have multiple cut-planes. The multiple cut-planes of the sausage correspond to the multiple cutting edges of the multi-blade used to cut the sausage. The multiple cut-planes are dissimilar to each other. That is, the multiple cut-planes are different planes.

Multi-blades have a single cutting edge that penetrates, incises, or intersects with the outer cylindrical surface of a sausage. Said differently, multi-blades produce sausages with a single cut-plane that intersects with the outer cylindrical surface of a sausage. For blades 40a, 40b, and 40c the vertical cutting edge is the only cutting edge that incises the outer cylindrical surfaces of the sausages 120, 130, and 140. The other cutting edges are within the outer cylindrical surfaces of the sausages 120, 130, and 140, and the other cutting edges do not incise the outer cylindrical surfaces of the sausages 120, 130, and 140.

With reference to FIGS. 4A through 4D, two example multi-blades 400 and 420 are illustrated. These multi-blades 400 and 420 are comprised of three individual blades that are combined together. For example, multi-blade 400 is made by combining three individual blades 402, 404, and 406 (refer to FIG. 4B). Similarly, multi-blade 420 is made by combining individual blades 422, 424, and 426 (refer to FIG. 4D). In some embodiments, two individual blades are combined together to form a multi-blade. In some embodiments, more than three individual blades are combined together to form a multi-blade. In some embodiments, multi-blades can be made without combining two or more blades together. For example, a multi-blade can be made by welding or otherwise attaching multiple cutting blades onto a single shank to form an inverted t-shape, inverted T-shape, inverted Y-shape, and so on.

In some cases, the blades for the devices provided herein can be interchangeable. That is, a plurality of blades can be changed out of the same blade holder for various reasons. For example in some cases, a user may desired to change the blade because the blade has become dull and a sharper blade is desired. In some cases, the blade may be changed to convert to a different style of cutting (e.g., from an inverted T-shape to an inverted t-shape, or other types of blade shapes). In some embodiments, the blades have markings or configurations to assist the user in installing the blade. For example, depth markings on the blade can assist the user with assembling the blade into the blade holder at a desired location.

The multi-blade 400 has an asymmetrical side profile. That is, the multi-blade 400 has a pointed leading edge 408 on one side, and a slanted leading edge 410 on the second side. In some embodiments, the multi-blade 400 is reversible. That is, in some embodiments, pointed leading edge 408 is used as the cutting edge of multi-blade 400. However, in alternate embodiments, slanted leading edge 410 is used as the cutting edge of multi-blade 400.

The multi-blade 420 has a generally symmetrical side profile. Both sides have a slanted leading edge 428 and 430 that can be used as the cutting edge. The multi-blade 420 is also reversible.

Figure 5:
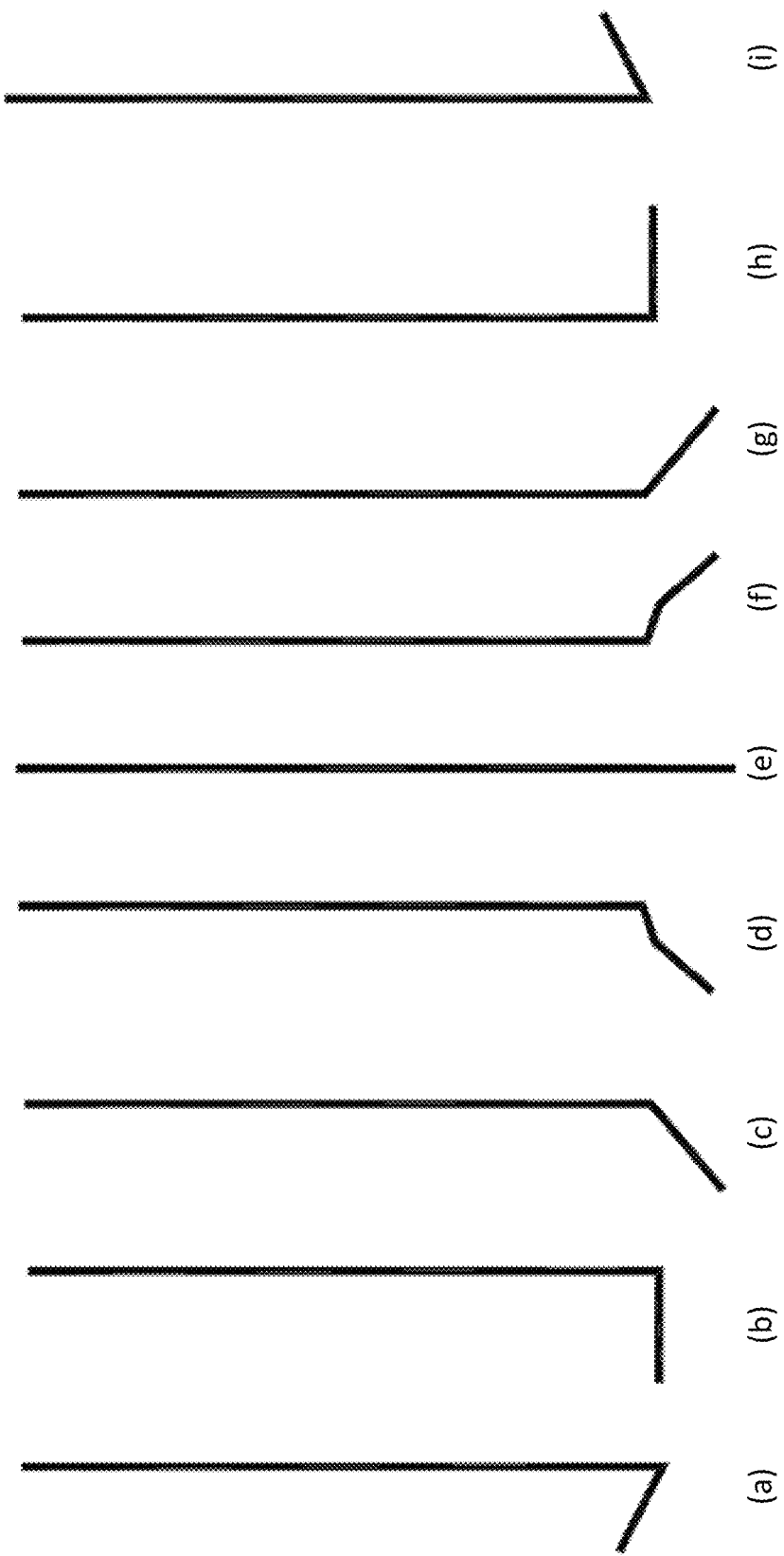
FIG. 5 depicts various blade configurations for longitudinally cutting sausages in accordance with some embodiments provided herein.

With reference to FIG. 5, a variety of example individual blades (a)-(i) are shown in end views. These blades can be combined in groups of two or more to create a multi-blade design. The multi-blade designs created by combining two or more individual blades (a)-(i) can be symmetrical or asymmetrical. The cross-sectional shape of the sausage cut using the multi-blade will depend on the configuration of the multi-blade used.

Figure 6A:
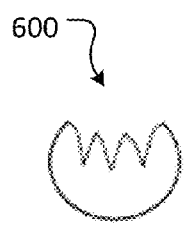
FIGS. 6A-6D are example cross-sectional views of sausages after cutting using an apparatus for longitudinally cutting a sausage in accordance with some embodiments provided herein.
Figure 6B:
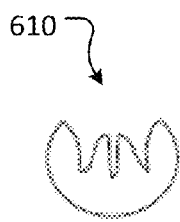
Figure 6C:
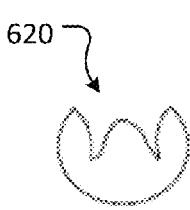
Figure 6D:
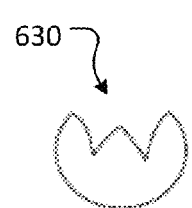

With reference to FIGS. 6A-6D, example sausage cross-sections 600, 610, 620, and 630 are depicted. FIGS. 6A and 6B illustrate types of cross-sections 600 and 610 that can be created, for example, using multi-blades with a three-pronged pitchfork or an inverted t-shape. FIGS. 6C and 6D illustrate types of cross-sections 620 and 630 that can be created, for example, using multi-blades with an inverted Y-shape. All of the cross-sections 600, 610, 620, and 630 are such that a blade with a single cutting edge cannot make them with a single cutting motion. However, a multi-blade type of blade can be used to make the cross-sections 600, 610, 620, and 630 with a single cutting motion, because the cross-sections 600, 610, 620, and 630. The cross-sections 600, 610, 620, and 630 represent sausages that have multiple cut-planes.

While the cross-sections 600, 610, 620, and 630 may appear to some observers like meat material has been removed from the sausages, in fact no substantial amount of meat has been removed. That appearance is related to the fact that the cutting of the sausages using the devices and methods provided herein allows the opening of the sausages such that they are no longer cylindrical in cross-section.

Figure 7:
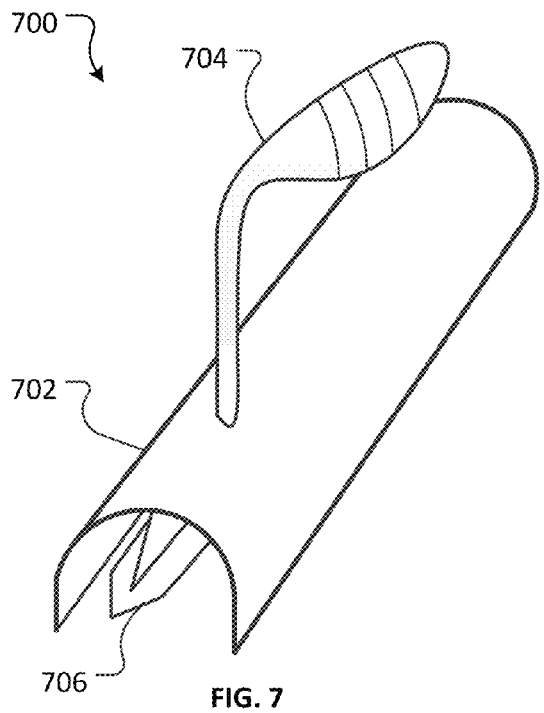
FIG. 7 is an illustration of another example apparatus for longitudinally cutting a sausage in accordance with some embodiments provided herein.

With reference to FIG. 7, another example embodiment of a sausage-cutting device 700 is illustrated. The sausage-cutting device 700 includes a housing 702, a handle 704, and a multi-blade 706.

To operate the sausage-cutting device 700 a sausage can be placed on a surface that is adapted to resist axial displacement of the sausage. Such surfaces are described above in regard to surface 26. The sausage-cutting device 700 can be aligned at an end of the sausage. The user can then grasp the handle 704 and push the sausage-cutting device 700 towards the sausage such that the multi-blade 706 is properly positioned to intersect the sausage. The user can continue pushing the sausage-cutting device to cause the multi-blade 706 to cut the sausage longitudinally. The surface on which the sausage is placed can resist the tendency of the sausage of moving in the direction that the sausage-cutting device 700 is being moved. The multi-blade 706 can be pushed all the way through the longitudinal length of the sausage to complete the cutting.

One of ordinary skill in the art will recognize that the concepts described herein regarding processing sausages to attain a single cut-plane that intersects the outer periphery and at least one additional internal cut-plane can also be applied further upstream in the sausage making process (as distinguished from post-processing of pre-formed sausages). In such cases, tooling can be implemented at the sausage extrusion process that can create sausages with multiple discontinuous-planes as produced from the extrusion process.

Figure 8:
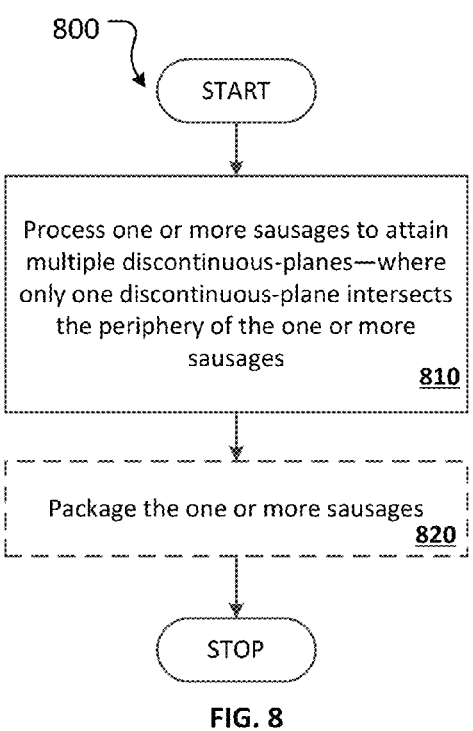
FIG. 8 is flowchart of a method for processing and packaging sausages in accordance with some embodiments provided herein.

FIG. 8 is a flowchart of an example method 800 for producing sausages with multiple discontinuous-planes in accordance with the devices and methods provided herein. At operation 810, one or more sausages are processed to attain multiple discontinuous-planes, wherein only one discontinuous-plane intersects the periphery of the one or more sausages. In some implementations, step 810 can take place on a post-processing basis using a multi-blade cutter as described above. In other implementations, step 810 can take place concurrently with the sausage extrusion process. At operation 820, optionally, the one or more sausages with multiple discontinuous-planes are packaged. The packaging can be a variety of types. For example, without limitation, in some embodiments the packaging is a plastic wrap. In some embodiments, the packaging is vacuum sealed. In some embodiments, the packaging is a sealable container. In some embodiments, the packaging is a wrapping of freezer paper or butcher paper.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A sausage having a generally cylindrical shape and comprising:
    a food material that is shaped by an outer casing into (i) a generally cylindrical middle portion, (ii) a first generally hemispherical end portion, and (iii) a second generally hemispherical end portion, wherein the first and second generally hemispherical end portions are individually located at opposite ends of the generally cylindrical middle portion;
    a first separation within the food material,
        wherein the first separation within the food material is at least partially characterized by a first surface of food material and a second surface of food material, wherein the first and second surfaces of food material generally butt against each other,
        wherein the first separation within the food material but no other separation within the food material intersects an outer surface of the generally cylindrical middle portion; and
    a second separation within the food material,
        wherein the second separation within the food material is at least partially characterized by a third surface of food material and a fourth surface of food material, wherein the third and fourth surfaces of food material generally butt against each other,
        wherein the generally cylindrical shape of the sausage is not altered by the first or second separations,
        wherein the second separation within the food material intersects the first separation within the food material,
        wherein the second separation within the food material does not intersect the outer surface of the generally cylindrical middle portion,
        wherein the first separation within the food material intersects an outer surface of each of the first and second generally hemispherical end portions, and wherein the second separation within the food material intersects the outer surface of each of the first and second generally hemispherical end portions, and
        wherein the sausage is adapted to expand upon heating, from the generally cylindrical shape, such that the first surface of food material and the second surface of food material move apart from each other and no longer generally butt against each other.

2. The sausage of claim 1, wherein the sausage defines a curved longitudinal axis and circular transverse cross-sections at multiple points along the curved longitudinal axis.

3. The sausage of claim 1, comprising a third separation within the food material that intersects the first separation or the second separation while not intersecting the outer surface of the generally cylindrical middle portion.

4. The sausage of claim 1, wherein the first separation within the food material intersects a longitudinal axis of the sausage or lies within a plane that intersects the longitudinal axis.

5. The sausage of claim 1, wherein the first separation within the food material and the second separation within the food material are substantially perpendicular to each other.

6. The sausage of claim 1, wherein the first separation within the food material and the second separation within the food material are not perpendicular to each other.

7. A food article having a generally cylindrical shape and comprising:
    a sausage that is shaped by an outer casing to have: (i) a middle portion that defines a generally cylindrical outer surface and (ii) two end portions that each define generally hemispherical outer surfaces, wherein the two end portions are individually located on opposite ends of the middle portion,
        wherein the sausage has been processed to define a first incision and a second incision, wherein the first incision and the second incision intersect,
        wherein the generally cylindrical shape of the food article is not altered by the first incision and the second incision,
        wherein the first incision penetrates into the sausage through the generally cylindrical outer surface and through each of the generally hemispherical outer surfaces, wherein the first incision is at least partially characterized by a first surface of food material that generally butts against a second surface of food material,
        wherein the second incision penetrates into the sausage through each of the generally hemispherical outer surfaces and is located entirely within the generally cylindrical outer surface such that the second incision does not penetrate through the generally cylindrical outer surface, and
        wherein the sausage is adapted to expand upon heating, from the generally cylindrical shape, such that the first surface of food material and the second surface of food material move apart from each other upon heating to result in the first surface of food material no longer generally butting against the second surface of food material.

8. The food article of claim 7, further comprising a third incision that penetrates into the sausage through each of the generally hemispherical outer surfaces but not through the generally cylindrical outer surface.

9. The food article of claim 7, wherein the first incision penetrates into the sausage so as to lay within a plane that intersects the longitudinal axis.

10. The food article of claim 7, wherein the first incision and the second incision are not perpendicular to each other.

11. The food article of claim 7, wherein the first incision and the second incision are perpendicular to each other.

12. The food article of claim 7, wherein the first incision extends through the second incision.

13. The food article of claim 7, wherein the first incision and the second incision each have widths that are less than a diameter of the sausage.

\* \* \* \* \*